Sept. 3, 1935.  H. A. WERFEL  2,013,617
DRINK SHAKER
Filed Feb. 23, 1933
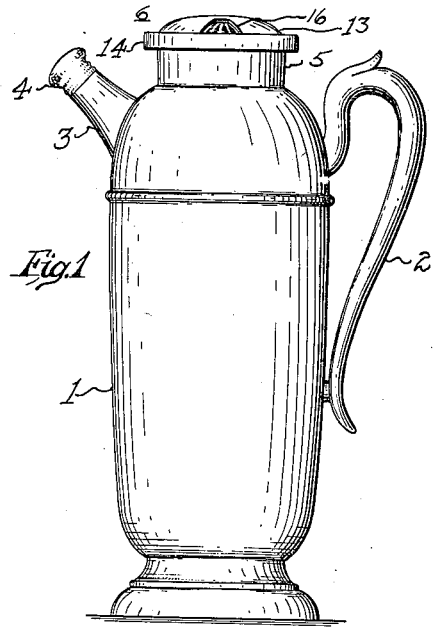
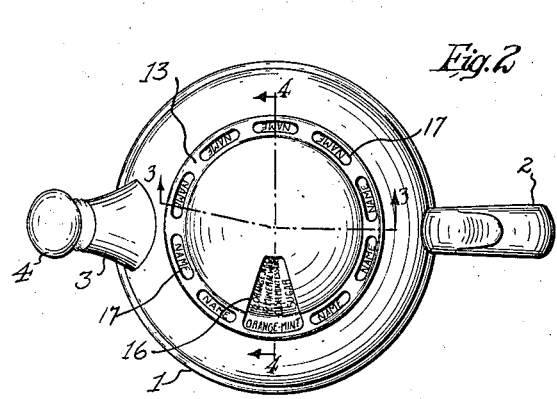
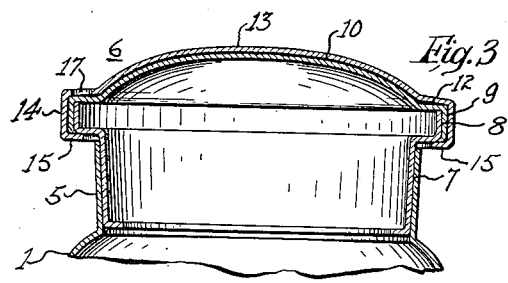
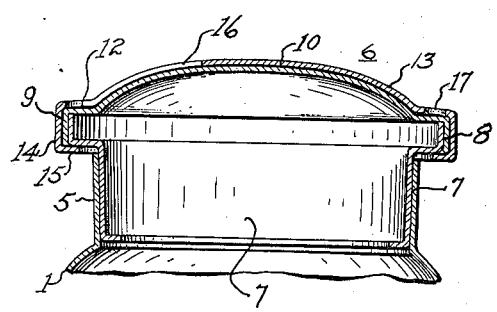
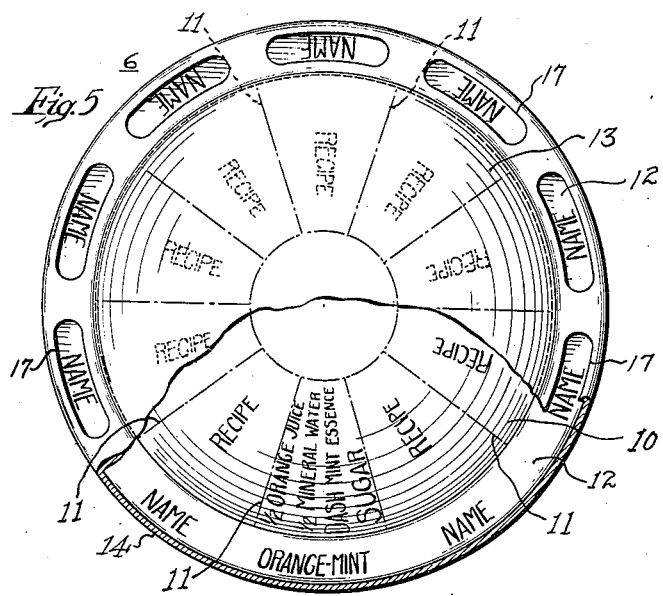
INVENTOR
Harry A. Werfel,
BY
ATTORNEY Patented Sept. 3, 1935

2,013,617

UNITED STATES PATENT OFFICE 2,013,617

DRINK SHAKER

Harry A. Werfel, Caldwell, N. J., assignor, by mesne assignments, to The Napier Company, Meriden, Conn., a corporation of Connecticut Application February 23, 1933, Serial No. 658,000

6 Claims. (Cl. 220—1)

This invention relates, generally, to drink shakers or containers adapted to receive the ingredients of a drink for thoroughly intermixing these ingredients to produce the desired drink, the intermixing being accomplished by manually shaking or agitating the container; and the invention has reference, more particularly, to a drink shaker having a novel cover or cap adapted to display, at the will of the user, any one of a number of recipes to be used in preparing a desired drink.

Drink shakers have been made in the past with a number of recipes depicted on the outer surface of the shaker and some of these shakers have had a band turnably mounted on the exterior surface of the shaker, the said band having an opening therein for viewing any desired recipe. Such a turnable band, however, interferes with the placing of a handle and spout on the shaker so that when these bands are employed, the shaker of necessity must be a plain container without a handle or spout and hence the same is unattractive and cannot command a good price, nor is the same as serviceable as a shaker with a handle and spout. Furthermore, with the recipes depicted on the shaker itself, it is usually necessary to hold the shaker in the hand and in an elevated position in order to read any desired recipe. This is objectionable because the user cannot use that hand while preparing the ingredients, nor can he readily pour an ingredient into the shaker without first placing the shaker on a table or other support, thereby slowing up the preparation of the drink.

The principal object of the present invention is to provide a drink shaker having a novel cover or closure provided with a number of drink recipes depicted on the upper surface thereof, said cover having an improved opaque indexing member overlying the upper surface thereof, and said indexing member having an opening therein and being turnably adjustable so that any desired one of said recipes may be observed at one time, and said indexing member also having a plurality of annularly disposed slots or apertures therein for enabling the reading of the titles of all of the drink recipes at one time.

Still another object of the present invention is to provide a novel cover or closure of the above character which is of extremely simple construction and is rugged so as to have an exceedingly long life in use.

Other objects of this invention, not at this time more particularly enumerated, will be clearly understood from the following detailed description of the same.

The invention is clearly illustrated in the accompanying drawing, in which:

Fig. 1 is a view in elevation of a drink shaker provided with the novel cover of the present invention.

Fig. 2 is an enlarged plan view of the structure shown in Fig. 1.

Fig. 3 is an enlarged fragmentary sectional view taken along line 3—3 of Fig. 2 looking in the direction of the arrows.

Fig. 4 is an enlarged fragmentary sectional view taken along line 4—4 of Fig. 2 looking in the direction of the arrows.

Fig. 5 is an enlarged plan view, with parts broken away, of the novel drink shaker cover of the present invention.

Similar characters of reference are employed in all of the above described views to indicate corresponding parts.

Referring now to the said drawing, the reference numeral 1 designates the body or container portion of a drink shaker, which body portion is illustrated as provided with a handle 2 and a spout 3 adapted to be closed by a screw cap 4. The top of the body portion 1 is provided with an open neck 5 which is adapted to be closed by the novel cover or closure of the present invention designated as a whole by the reference numeral 6.

The cover or closure 6 is formed with a depending annular flange or ring member 7 which is preferably slightly tapered or converging with respect to the vertical axis of the cover so as to fit snugly within the neck 5 of the drink shaker. The annular ring member 7 is illustrated as having an annularly enlarged upper portion 8 to which is secured the surrounding depending flange 9 of the cover top wall 10. The cover top wall 10 is illustrated as of substantially dome shape, the same having a substantially bow-shaped cross-section, although it is to be understood that this cover top wall 10 may be of any other desired shape, for example, the same may be flat.

As especially shown in Figs. 2 and 5, the greater portion of the upper surface of the cover top wall 10 is illustrated as sub-divided into a plurality of annularly disposed segments 11, each of which segments has a recipe depicted thereon. These recipes may be embossed on the surface of the cover top wall 10 or they may be printed or otherwise marked upon this surface. This surface is illustrated as having ten of the segments 11, although it is to be understood that a greater or lesser number of these segments may be used. Radially outwardly of these segments 11, there is provided an annular space 12 on the upper surface of the cover top wall upon which is depicted the titles or names of the respective recipes, each of such names being depicted radially outwardly of its respective recipe.

In the drawing, one of the segments 11 is illustrated as having a recipe completely written out therein and the title of this recipe, namely, orange-mint, is positioned radially outwardly of this recipe. The remaining segments 11 are merely marked with the word "recipe" to indicate that they are adapted to have recipes depicted thereon and the corresponding titles of these recipes are merely indicated by the word "name".

An indexing member 13 overlies the cover top wall 10 and is shaped so as to substantially conform to the contour of this cover top wall. The indexing member 13 is provided with an annularly depending flange 14 which extends down at the sides of the flange 9 of the top wall 10. An inwardly directed transverse flange 15 is formed at the bottom of the flange 14 and underlies the enlarged upper portion 8 of the cover ring member 7, thereby retaining the indexing member 13 in assembled relation with the ring member 7 and the cover top wall 10 while permitting this indexing member to be turned with respect to these members 7 and 10 about the vertical axis of the cover 6.

Indexing member 13 is opaque and may be made of pressed sheet metal or other suitable material. This indexing member is provided with a segmental aperture 16 which is of such size and location as to disclose one of the segments 11 together with that portion of the annular space 12 showing the name or title of the recipe written in such segment 11. The indexing member 13 is also provided, in overlying relation to the annular space 12, with a plurality of annularly arranged and mutually spaced openings or slots 17, through which the titles or names of the several recipes may be observed. Thus, by turning the indexing member 13 so that the segmental aperture 16 therein overlies one of the segments 11 disclosing a recipe, this recipe may be read in full together with the title thereof, and at the same time, the names or titles of all the remaining recipes may be observed through the openings 17.

When it is desired to read any particular recipe, the title of the recipe is first observed through one of the openings 17 and the indexing member 13 is then turned so that its aperture 16 overlies the particular recipe desired, whereupon such recipe may be readily read without confusion with the remainder of the recipes, which remaining recipes are completely hidden, with the exception of their titles, by the indexing member.

Owing to the substantially flat nature of the cover top wall 10, the several recipes may be readily read without straining the eyes and without holding the drink shaker or the cover 6 thereof in difficult positions. Thus, when preparing a drink, the cover 6 may be removed from the body of the drink shaker and laid upon a table or other support with the desired recipe exposed, and the drink may be readily prepared by putting the necessary ingredients into the body of the drink shaker while the same is also resting upon the table.

Although the novel drink shaker cover of the present invention is illustrated as applied to a drink shaker having a handle and a spout, it will be apparent that this cover may be applied to any type of drink shaker without interfering with the construction of the shaker.

It will be apparent that if desired the apertures 17 may be omitted, in which case the name of any particular recipe may be located by turning the indexing member 13.

As many changes could be made in the above construction and many apparently widely different embodiments of this invention could be made without departing from the scope thereof, as defined by the following claims, it is intended that all matter contained in the above description or shown in the accompanying drawing shall be interpreted as illustrative and not in a limiting sense.

What is claimed is:

1. In a drink shaker, a cover comprising an inner cover member having a laterally extending flange thereon at its periphery and a depending flange of smaller diameter below said flange, an outer cover member overlying said inner member and having a peripheral portion extending around and received beneath said laterally extending peripheral flange and rotatable thereon, and selectively operative recipe indicating devices on said cover members including name and ingredient indicating means on said inner cover member and cooperating aperture means on said outer cover member for selectively indicating any selected recipe.

2. In a drink shaker, a cover comprising an inner cover member having a laterally extending flange thereon at its periphery and a depending flange of smaller diameter below said flange, an outer cover member overlying said inner member and having a peripheral portion extending around and received beneath said laterally extending peripheral flange and rotatable thereon, and selectively operative recipe indicating devices on said cover members, including on said inner cover member a plurality of segmental ingredient indications and each having an adjacent name indication, and on said outer cover member a single segmental aperture means for selectively exposing any one of said ingredient indications and its corresponding name indication.

3. In a drink shaker, a cover comprising an inner cover member having a laterally extending flange thereon at its periphery and a depending flange of smaller diameter below said flange, an outer cover member overlying said inner member and having a peripheral portion extending around and received beneath said laterally extending peripheral flange and rotatable thereon, and selectively operative recipe indicating devices on said cover members, including on said inner cover member a plurality of segmental ingredient indications and each having an adjacent name indication, and on said outer cover member an aperture means for selectively exposing one of said ingredient indications when indicating a corresponding name indication, and also a plurality of slots for exposing said name indications.

4. In a drink shaker having a container portion, a removable cover for said container portion, said cover comprising a top wall having a plurality of consecutively disposed recipes depicted on the upper surface thereof, said top wall having the names of said recipes consecutively depicted on its upper surface and disposed so that each name is adjacent its corresponding recipe, and an opaque indexing member overlying the upper surface of said top wall and substantially conforming thereto, said indexing member having an opening therein and being movable over said top wall so that said opening may pass over said consecutively disposed recipes and the names thereof, whereby any desired recipe, together with its name, may be seen through said opening without confusion with the remainder of the recipes.

5. In a drink shaker having a container portion, a removable cover for said container portion, said cover comprising a top wall having a plurality of consecutively disposed and annularly arranged recipes depicted on the upper surface thereof, each of said recipes occupying a segmental portion of the area of said upper surface, each of said segmental portions being bounded by two radii and two arcs having the vertical axis of said cover as a center, said top wall having the names of said recipes consecutively depicted and annularly arranged on its upper surface and disposed so that each name is adjacent its corresponding recipe, and an opaque indexing member overlying the upper surface of said top wall and substantially conforming thereto, said indexing member having a depending flange portion engaging the side walls of said cover for retaining said indexing member on said cover while permitting the turning of said indexing member with respect to said cover, said indexing member having a segmental opening therein and being turnable about the vertical axis of said cover so that said opening may pass over said consecutively disposed recipes and the names thereof, whereby any desired recipe, together with its name, may be seen through said opening without confusion with the remainder of the recipes.

6. In a drink shaker having a container portion, a cylindrical removable cover for said container portion, said cover comprising a top wall having a plurality of consecutively arranged recipes disposed annularly about the vertical axis of said cover and depicted on the upper surface of said top wall, each of said recipes occupying a segmental portion of the area of said upper surface, said top wall having the names of said recipes consecutively depicted in annular arrangement on its upper surface radially outwardly of said recipes, each of said names being disposed adjacent its corresponding recipe, and an opaque indexing member overlying the upper surface of said top wall and substantially conforming thereto, said indexing member having a depending flange portion engaging the side walls of said cover for retaining said indexing member on said cover while permitting the turning of said indexing member with respect to said cover, said indexing member having a segmental opening therein and being turnable about the vertical axis of said cover so that said opening may pass over said consecutively disposed recipes and the names thereof, whereby any desired recipe, together with its name, may be seen through said opening, said indexing member having additional annularly disposed, mutually spaced openings overlying the names of the several recipes whereby all of such names may be observed at one time.

HARRY A. WERFEL.